United States Patent [19]

Davidson

[11] 4,356,163

[45] Oct. 26, 1982

[54] PROCESS FOR THE PRODUCTION OF HYDROGEN

[75] Inventor: James G. Davidson, Paducah, Ky.

[73] Assignee: Davidson Research Ltd., Grand Rapids, Mich.

[21] Appl. No.: 334,879

[22] Filed: Dec. 28, 1981

[51] Int. Cl.$^3$ .............................................. C01B 1/02
[52] U.S. Cl. ................................... 423/657; 423/579; 423/648 R
[58] Field of Search ................... 423/657, 648 R, 579, 423/641

[56] References Cited

U.S. PATENT DOCUMENTS

| | | |
|---|---|---|
| 883,531 | 3/1908 | Foersterling et al. |
| 909,536 | 1/1909 | Brindley . |
| 3,313,598 | 4/1967 | Gluckstein ............................ 23/211 |
| 3,459,493 | 8/1969 | Ross ........................................ 23/1 |
| 3,490,871 | 1/1970 | Miller et al. .......................... 23/210 |
| 3,729,548 | 4/1973 | Lemke ................................. 423/371 |
| 4,010,249 | 3/1977 | DuPont ................................ 423/657 |
| 4,162,302 | 7/1979 | Hirayama et al. ............... 423/648 R |
| 4,230,682 | 10/1980 | Bamberger ...................... 423/648 R |
| 4,309,403 | 1/1982 | Robinson et al. ............... 423/648 R |

OTHER PUBLICATIONS

Jacobson, *Encyclopedia of Chemical Reactions*, vol. VI, Reinhold Publishing Corporation (1956), pp. 256, 343.

*Primary Examiner*—Earl C. Thomas
*Assistant Examiner*—Wayne A. Langel
*Attorney, Agent, or Firm*—Waters, Lesniak & Willey

[57] ABSTRACT

A process is provided for producing hydrogen by combining an alkali metal with $H_2O$ to produce hydrogen and an alkali metal hydroxide. The alkali metal hydroxide is then combined with an alkali metal to produce hydrogen and an alkali metal monoxide. The alkali metal monoxide is then processed through a series of reactions to reclaim the alkali metal for reuse in the hydrogen producing steps of the process.

7 Claims, No Drawings

PROCESS FOR THE PRODUCTION OF HYDROGEN

BACKGROUND OF THE INVENTION

1. Field of the Invention

The present invention relates to hydrogen, and, more particularly, to a process for producing hydrogen from $H_2O$.

2. Description of the Prior Art

The concern over the possible exhaustion of realistic sources of supply of fossil fuels has become widespread. This concern has led to increased research in developing alternative sources of energy. Of the various alternative sources of energy being explored, hydrogen appears to have significant potential as a universal fuel and energy source, with an abundant source of supply as a constituent of water.

Currently, the most prevalent means for commercially producing hydrogen from water has been electrolysis. However, current methods are costly, and none is competitive with fossil fuels. While a wide variety of thermal and chemical processes have been developed, none has provided an inexpensive and efficient means for producing hydrogen from water. A process that could economically and efficiently produce hydrogen from water would virtually eliminate the current energy crisis.

SUMMARY OF THE INVENTION

According to the present invention, there is provided a unique process that economically and efficiently produces hydrogen from $H_2O$. The process includes a unique sequential combination of chemical reactions. The first step of the process is to combine $H_2O$ and an alkali metal in a first reaction zone to produce hydrogen and alkali metal hydroxide. The preferred alkali metals are sodium and potassium, and mixtures thereof, with sodium being especially preferred. It is also preferred that the $H_2O$ be gradually added to the alkali metal in the reaction zone for the best reaction control. The hydrogen produced in the first reaction zone is removed and collected, and the alkali metal hydroxide formed is transferred to a second reaction zoned where it is combined with an alkali metal to produce hydrogen and alkali metal monoxide, preferably at a temperature above 300° C.

The hydrogen is removed from the second reaction zone and collected, and the alkali metal monoxide is transferred to a third reaction zone where it is combined with oxygen to produce alkali metal peroxide, preferably at a temperature between about 300° to 400° C.

The alkali metal peroxide is then transferred to a fourth reaction zone where it is combined with carbon to produce alkali metal carbonate and alkali metal, preferably at a temperature between about 300° to 400° C.

The alkali metal is removed from the fourth reaction zone and is returned to either the first or second reaction zones for use in the first or the second stage reactions. The alkali metal carbonate is transferred to a fifth reaction zone and is heated to produce alkali metal, oxygen and carbon dioxide. The temperature should be in excess of 882° C., with in excess of about 973° C. being preferred. Further, reduced pressure on the order of about 50 mm. of Hg. is preferred. The alkali metal is then removed from the fifth reaction zone and returned to either the first or the second reaction zones for use in the first and second reactions.

A beneficial feature of the above sequence of reactions is that all of the reactions except the reaction in the fifth reaction zone are exothermic and release heat. Only the disassociation of the alkali metal carbonate in the fifth reaction zone to produce alkali metal, oxygen and carbon dioxide is an endothermic reaction which absorbs heat. Accordingly, in the preferred practice of the process of the present invention, the heat generated in the exothermic reactions is harnessed and utilized in the fifth reaction zone to minimize the external heat required for the requisite reaction in the fifth reaction zone. Also, it is preferred that the oxygen produced in the fifth reaction zone be collected and supplied to the thid reaction zone as a reactant.

DESCRIPTION OF THE PREFERRED EMBODIMENTS

The unique process of the present invention comprises, in sequence, the following chemical reactions, wherein sodium is used by way of example as the alkali metal required in the process:

6 Na + 6 $H_2O$ → 6 NaOH + 3 $H_2$ (1)

6 NaOH + 6 Na → 6 $Na_2O$ + 3 $H_2$ (2)

6 $Na_2O$ + 3 $O_2$ → 6 $Na_2O_2$ (3)

6 $Na_2O_2$ + 4 C → 4 $Na_2CO_3$ + 4 Na (4)

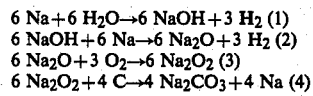

$$4\ Na_2CO_3 \xrightarrow{\Delta} 8\ Na + 2\ O_2 + 4\ CO_2 \tag{5}$$

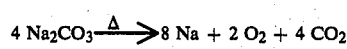

In the first reaction, $H_2O$ and an alkali metal are combined in a reaction zone to produce hydrogen and an alkali metal hydroxide, e.g., sodium hydroxide. Although any of the alkali metals, i.e., lithium, sodium, potassium, rubidium, cesium or mixtures thereof can be used as the alkali metal in the first reaction, potassium and sodium and mixtures thereof have been found to be preferred, with sodium being especially preferred. While $H_2O$ will combine with sodium to produce sodium hydroxide and hydrogen at any temperature greater than −80° C., the first reaction is generally run at ambient temperature, with the excess heat being generated by this exothermic reaction being utilized to add heat to the fifth reaction of the process which is endothermic.

The reaction zone is preferably a reaction vessel, such as a Monel lined steel or other non-corrosive covered reaction vessel with means for metered introduction of water and removal of hydrogen gas. The sodium, which is preferably in the solid state, is placed in the reaction vessel, and water is added to the sodium. Preferably, a vacuum is drawn before the water addition to minimize the amount of oxygen present to avoid ignition of the hydrogen or the sodium. The water should be added gradually so as to continually replace the water reacting the sodium. The procedure of gradual addition of the water to the sodium or other alkali metal avoids the explosive reaction between the alkali metal and the water which would otherwise take place.

Since the hydrogen generated from this first reaction will have some moisture content, it should be dried by conventional methods before storage or use.

The solid sodium hydroxide from the first reaction is then transferred to a second reaction zone, which can comprise a reaction vessel similar to the vessel utilized in the first reaction. In the second reaction, it is preferred that the sodium be molten to optimize the mixing between the sodium hydroxide and the sodium for complete conversion of the sodium hydroxide to sodium monoxide and complete release of hydrogen gas. Accordingly, the reaction vessel should initially be heated to a temperature in excess of 300° C. to maintain the sodium in a molten state. However, since this reaction is also exothermic, excess heat will be generated to not only maintain the temperature in excess of 300° C. but will also yield excess heat which can be utilized in the fifth reaction which is endothermic. The hydrogen gas produced by the second reaction is generally dry and can be simply collected and stored.

The sodium monoxide is then transferred to a third reaction zone, which can be a similar reaction vessel with means for introducing gaseous oxygen. It is preferred that this reaction be run in excess of 300° C., with 300° C. to 400° C. being the preferred temperature range for this reaction. It is important that the oxygen be dry to prevent $H_2O$ from entering the reaction and converting the sodium monoxide to sodium hydroxide. Since this reaction is also exothermic, the heat generated will maintain the reaction vessel at the desired temperature, as well as providing excess heat to supplement the heat required in the fifth reaction which is endothermic.

The sodium peroxide produced in the third reaction vessel is then transferred to a fourth reaction vessel where it is combined with elemental carbon to produce sodium carbonate and sodium. Since it is preferred to run this fourth reaction at between about 300° C. and 400° C., an initial heat input is required to initiate the reaction at the desired rate. Care should be taken that the temperature does not exceed 460° C., which is the decomposition temperature of sodium peroxide. The sodium produced from this reaction is then returned to either the first or the second reaction zones for reuse, while the sodium carbonate is transferred to the fifth reaction zone.

Since the rate of the fifth reaction can be increased by lowering the pressure, a vacuum is applied to the fifth reaction vessel to reduce the pressure to approximately 50 mm of Hg. The temperature of the fifth reaction vessel should be in excess of about 882° C. and, preferably, in excess of about 973° C. Heat is applied to the reaction vessel until the sodium carbonate is completely disassociated into the gaseous constituents of sodium, oxygen and carbon dioxide. By cooling the reaction vessel to about 600° to 700° C., the oxygen and carbon dioxide can be removed as a gas while the sodium will condense to molten sodium, which can then be returned to either the first or second reaction zones.

Thus, by the unique sequence of reactions of the process of the present invention, virtually all of the hydrogen from the starting $H_2O$ is converted to gaseous hydrogen and collected and virtually all of the sodium is regenerated for reuse. In addition, the majority of the oxygen required in the third reaction zone can be supplied from the oxygen generated in the fifth reaction zone. Because the excess heat generated by the first four exothermic reactions can be utilized in the fifth endothermic reaction, the external heat required for the entire process is minimized. Accordingly, the process is efficient and economical and produces a valuable supply of hydrogen, with $H_2O$ being the only major consumed starting material.

In order to further illustrate the process of the present invention, reference is made to the following example:

EXAMPLE 11.0 grams of sodium are placed in a reaction vessel which is a commercially available Monel lined Parr 4541 high pressure reaction vessel, which can withstand pressures up to 2,000 p.s.i. A vacuum is drawn on the vessel to remove any oxygen which could result in the ignition of hydrogen or sodium in the vessel. 9 grams of $H_2O$ are added at a constant and gradual rate at the rate of approximately 2 ml./min. After all the sodium is reacted, an outlet valve is opened on the reaction vessel to release the hydrogen that is produced. The hydrogen is passed through a conventional mechanical or chemical dryer and is then ready for use or storage.

The sodium hydroxide is then transferred to a second reaction vessel which is also a Monel lined Parr 4541 reaction vessel. The weight of the sodium hydroxide is approximately 19.5 grams. In order to insure that the sodium hydroxide is dry, the sodium hydroxide is heated to approximately 300° C. to 320° C. and approximately ½ g. of molten sodium is added with agitation to react with any remaining $H_2O$ in the sodium hydroxide. 11.5 g. of molten sodium are then added at a constant rate of approximately 2 ml./min., with agitation. After all of the sodium has reacted, the reactor outlet valve is opened to release hydrogen, which is then passed through a conventional dryer to render it suitable for use or storage.

The sodium monoxide reaction product is then crushed into a very fine powder and transferred to a third Parr 4541 Monel lined reaction vessel. Approximately 31 g. of sodium monoxide are present in the third reaction vessel. The third reaction vessel is heated to approximately 350° C. and then pressurized with oxygen to about 500 p.s.i., followed by agitation so that the powdered sodium monoxide is uniformly exposed to the oxygen. The reaction is allowed to continue until approximately 8 g. of oxygen have been consumed in the reaction, which can be verified by the pressure drop in the reaction vessel. The excess oxygen is released to bring the reaction vessel to atmospheric pressure.

Approximately 39 g. of sodium peroxide which are produced in the third reaction vessel are transferred to a fourth Parr 4541 Monel lined reaction vessel. Approximately 4 g. of powdered charcoal (elemental carbon) are then added. Any available oxygen is removed to prevent the oxygen from reacting with the sodium. The temperature of the vessel is raised to approximately 400° C. and agitated until the reaction is complete.

The sodium carbonate produced in the fourth reaction vessel, which weighs approximately 43 g., is transferred to a fifth reaction vessel, which is a corrosion resistent, low pressure vessel. The vessel is evacuated to about 50 mm. of Hg. and then heated to about 900° C. The vessel is maintained at approximately 900° C. until the reaction is complete, i.e., the sodium carbonate has disassociated into gaseous sodium, oxygen and carbon dioxide. The vessel is then cooled to about 600° C.–700° C., which condenses the sodium. The oxygen and carbon dioxide are then drawn off as gases, and the molten sodium is returned to either the first or second reaction zones.

In the above Example, potassium and sodium-potassium mixtures can be substituted for the sodium with similar results.

While the preferred embodiments of the present invention have been described, it will be obvious to those skilled in the art that various changes and modifications can be made in the process of the present invention without departing from the spirit thereof. Accordingly, the scope of the present invention is deemed to be limited only by the appended claims.

The embodiments of the invention in which an exclusive property or privilege is claimed are defined as follows:

1. A process for the production of hydrogen comprising in sequence:

combining $H_2O$ and alkali metal in a first reaction zone to produce hydrogen and alkali metal hydroxide;

removing and collecting hydrogen from said first reaction zone and transferring said alkali metal hydroxide to a second reaction zone and combining it with alkali metal to produce hydrogen and alkali metal monoxide;

removing and collecting hydrogen from said second reaction zone and transferring said alkali metal monoxide to a third reaction zone and combining it with oxygen to produce alkali metal peroxide;

transferring said alkali metal peroxide to a fourth reaction zone and combining it with carbon to produce alkali metal carbonate and alkali metal;

removing alkali metal from said fourth reaction zone and returning it to said first or said second reaction zone and transferring said alkali metal carbonate to a fifth reaction zone and heating it to produce alkali metal, oxygen and carbon dioxide; and, removing said alkali metal from said fifth reaction zone and returning it to said first or said second reaction zone.

2. The process according to claim 1 wherein said alkali metal is selected from the group consisting of sodium, potassium and mixtures thereof.

3. The process according to claim 2 wherein said alkali metal is sodium.

4. The process according to claim 3 wherein said $H_2O$ is water and is gradually adddded to said alkali metal in said first reaction zone; said alkali metal hydroxide is combined with said alkali metal at a temperature greater than about 300° C.; said alkali metal monoxide is combined with said oxygen at a temperature of about 300° to 400° C.; said alkali metal peroxide is combined with carbon at a temperature of about 300° to 400° C.; and said alkali metal carbonate is heated to greater than about 882° C. at a pressure less than atmospheric pressure.

5. The process according to claim 4 wherein heat generated from said first, second, third and fourth reaction zones is transferred to said fifth reaction zone.

6. The process according to claim 5 wherein oxygen produced in said fifth reaction zone is collected and supplied as a reactant to said third reaction zone.

7. The process according to claim 6 wherein the reaction in said first reaction zone is run at less than atmospheric pressure to remove available free oxygen from the reaction zone.

* * * * *